United States Patent
Taguchi et al.

[11] 3,963,162
[45] June 15, 1976

[54] METHOD OF SOLDERING STAINLESS STEEL PIPES BY USING SOFT SOLDERS

[75] Inventors: Toshihiko Taguchi, Showa; Takehiko Ito, Kamagaya, both of Japan

[73] Assignees: Senju Metal Industry Co. Ltd.; Nisshin Steel Co., Ltd., both of Tokyo, Japan

[22] Filed: July 15, 1974

[21] Appl. No.: 488,663

[30] Foreign Application Priority Data
Aug. 13, 1973 Japan.................................. 48-89991

[52] U.S. Cl................................ 228/134; 228/154; 228/263
[51] Int. Cl.².............................................. B23K 31/02
[58] Field of Search............... 29/474.4, 474.6, 484, 29/479, 489, 492, 496, 500, 501, 502, 504; 285/287; 148/26; 228/154, 126, 131, 134, 263

[56] References Cited
UNITED STATES PATENTS

| | | | |
|---|---|---|---|
| 1,877,433 | 9/1932 | Ten Brook | 285/287 |
| 2,480,723 | 8/1949 | Evans | 29/496 |
| 2,626,459 | 1/1953 | Viles | 29/504 |
| 3,025,596 | 3/1962 | Ward | 29/474.4 |
| 3,105,293 | 10/1963 | Skinner | 29/474.4 |
| 3,128,546 | 4/1964 | Schuster | 29/496 |
| 3,534,986 | 10/1970 | Hartmann | 29/489 |
| 3,584,187 | 6/1971 | Majetich | 29/492 |
| 3,597,285 | 8/1971 | Aronberg | 148/26 |
| 3,672,036 | 6/1972 | Ziemianski | 29/492 |
| 3,680,200 | 8/1972 | Terrill | 29/500 |
| 3,689,941 | 9/1972 | Chartet | 29/502 |
| 3,736,653 | 6/1973 | Maierson | 29/496 |
| 3,750,248 | 8/1973 | Morris | 29/479 |

Primary Examiner—Al Lawrence Smith
Assistant Examiner—Robert C. Watson
Attorney, Agent, or Firm—Stevens, Davis, Miller & Mosher

[57] ABSTRACT

A method of soldering stainless steel pipes by using soft solders, which comprises the steps of preparing a pipe joint having a diametral clearance of from 0.05 to 1.00 mm, filling said clearance with paste solder, heating said pipe joint to melt said paste solder, and feeding additional soft solder into said clearance immediately after said paste solder is molten by said heating. Particularly, the paste solder comprises from 20 to 80% by weight of powder solder and from 20 to 80% by weight of a flux composition comprising a mixture of from 5 to 50% by weight of phosphoric acid ($H_3PO_4$) and from 95 to 50% by weight of ammonium dihydrogenphosphate ($NH_4H_2PO_4$) dissolved or suspended in a vehicle.

7 Claims, 10 Drawing Figures

FIG. 1a
FIG. 1b
FIG. 1c
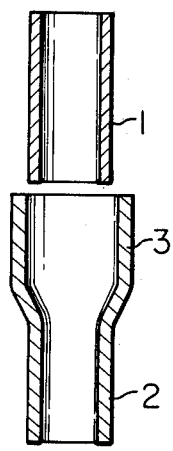
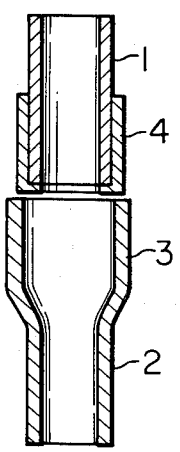
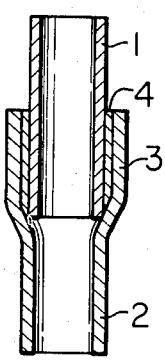
FIG. 1e
FIG. 1d
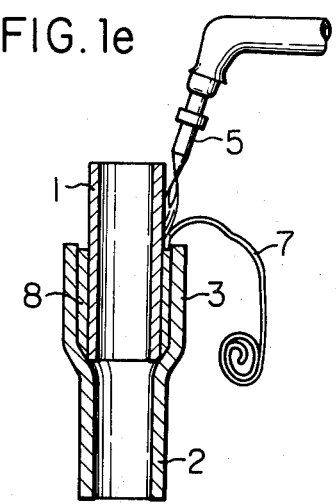
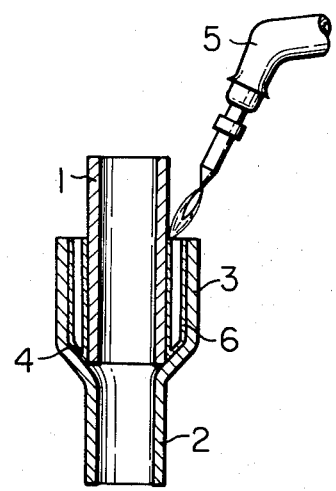

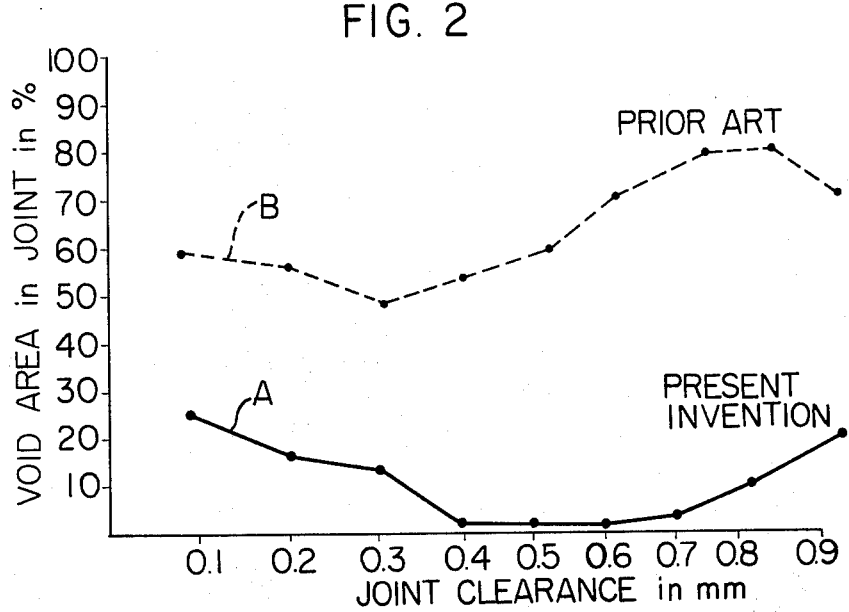
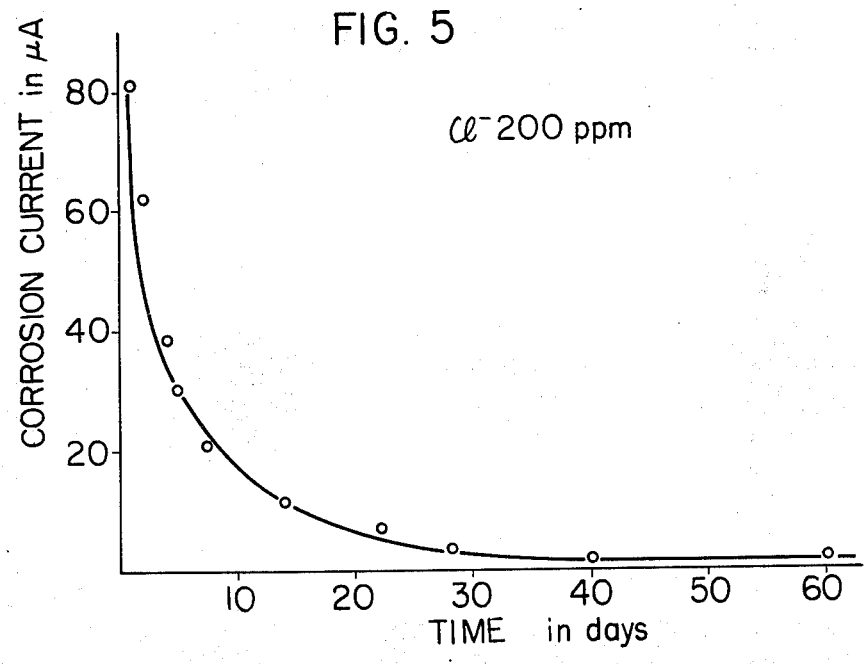

METHOD OF SOLDERING STAINLESS STEEL PIPES BY USING SOFT SOLDERS

BACKGROUND OF THE INVENTION

This invention relates to a method for soft-soldering stainless steel pipes for use in water or hot water supply piping.

Stainless steels are superior materials for use in water or hot water supply pipings because they have high resistance to corrosion and heat and are mechanically strong. Therefore, many attempts have been made to use stainless steel pipes for indoor and outdoor water supply piping. If it is possible to use stainless steel pipes for water supply piping, the problem of water contamination harmful to humans and found in the conventional galvanized steel pipes and copper pipes can be eliminated. Also, since the stainless steel pipes are rigid and superior in corrosion resistance, they can be embedded in a concrete floor. Whereas the conventional copper pipes have to be disposed on the floor surface, occupying space in the room. Since the degradation of the stainless steel pipes during their service is even less than that of polyvinyl chloride tubes, they are substantially free from water leakage or bursting due to water freezing in winter.

DESCRIPTION OF THE PRIOR ART

However, soldering of stainless steel has been very difficult or practically impossible, when soft solders are used. In particular, no one has succeeded in providing a soft-soldered stainless steel pipe joint satisfactory for use in water or hot water supply piping which requires the soldered pipe joint to have a high corrosion resistance and a good hermetic seal. This is because many difficulties arise from the facts given below:

1. Stainless steels are covered with a peculiar oxide film formed by the chromium contained therein. This oxide film is thin but hardly dissolvable and a special flux is required to completely dissolve the oxide film, during the soldering operation. But the flux residue of such a flux is inherently corrosive to the base metal, i.e. stainless steel.

2. The thermal conductivity of stainless steel is as low as from 0.03 to 0.06 cal/cm.sec.°C, which is very low as compared with the thermal conductivity of 0.94 cal./cm.sec°C for copper. Therefore, it is not unusual that, when the conventional soldering method is used, the temperature distribution at the pipe joint during the soldering operation becomes nonuniform, resulting in the formation of voids in the resulting joints due to uneven spreading of the molten solder. Such voids in a soldered pipe joint are fatal defects in pipe joints to be used in supply piping, because they adversely affect the durability against leakage, and it has been very difficult to solder the stainless steel pipes without forming big voids in the soldered joints.

3. In soldering stainless steels by using soft solders, an aggressive flux such as a chloride-containing flux must be used in order to remove the hard-to-dissolve oxide film. The flux residue cannot be completely washed from the interior of the soldered joint, and it has a strong corrosive action which results in pitting of the stainless steel base. Therefore, the chloride-containing flux should not be used in soldering stainless steel by soft solders.

4. Noncorrosive fluxes such as phosphoric acid base flux or phosphoric acid base flux containing a small quantity of copper salts or tin salts can be used in the end-feed soldering method, in which a bar or wire-shaped soft solder is fed into the joint clearance during soldering operation, for soldering stainless steel pipes. U.S. Pat. No. 3,597,285 discloses a flux composition for use in soldering stainless steel, which comprises orthophosphoric acid or phosphorous acid, and at last one member of finely divided copper and copper salts. However, a major portion of such a flux composition is comprised of phosphoric acid, and it contains copper or copper salts as an essential ingredient. Because of the narrow activation temperature range of such noncorrosive fluxes and the low thermal conductivity of stainless steel, the resulting pipe joint has many big voids and is unsatisfactory. It is extremely difficult to determine the most suitable time to feed soft solder into the joint clearance.

In addition, because the phosphoric acid-containing flux of the prior art has many inevitable disadvantages, paste solder containing phosphoric acid has also been proposed. However, the resulting paste-like composition is easily degraded during storage. For the purpose of improving the stability of the paste solder, a soldering composition e.g. such as disclosed in U.S. Ser. No. 217,832 filed Jan. 14, 1972 has been proposed, in which an inhibitor containing amine salts is added to the soldering composition. But the U.S. application does not disclose the soldering of stainless steel pipes by using paste solder, nor the combination the major proportion of which is ammonium dihydrogenphosphate and a small proportion is phosphoric acid.

5. It is difficult to provide proper accuracy of shape and size with the stainless steel pipe and fitting because of peculiar mechanical properties such as poor formability and spring-back action.

Therefore, it is also difficult to realize a proper clearance ranging from 0.1 to 0.2 mm with close tolerance in the pipe joint. When the joint clearance, which is critical for the soft solder to penetrate deep into the pipe joint, is excessive, or fluctuant, it can degrade the soldered pipe joint by allowing big voids to form therein.

For the above reasons, a soft-soldered pipe joint for stainless steel pipes which can be satisfactorily used in water or hot water supply piping has not yet been provided.

SUMMARY OF THE INVENTION

Accordingly, the main object of the present invention is to provide a method for joining stainless steel pipes which provides satisfactory pipe joints for use in hot water supply piping.

Another object of the invention is to provide a method for soldering stainless steel pipes by using soft solders, in which the conventional heating apparatus such as a resistance heating apparatus, an infrared ray heating apparatus, a torch lamp, a gas burner, etc. can be used.

Still another object of the invention is to provide a method for joining stainless steel pipes in which the chromium oxide film on the stainless steel surface is completely removed at the soldering temperature to activate the surface without the fear of corrosion of the soldered stainless steel pipe joint.

Still another object of the invention is to provide a method for soldering stainless steel pipes by using soft solders, which provides desirable stainless steel pipe joints substantially free from big voids even with a noncorrosive phosphoric acid base flux which has a narrow activation temperature range.

A further object of the invention is to provide a method for soldering stainless steel pipes by using soft solders, which provides satisfactory stainless steel pipe joints even under the relatively rough soldering conditions such as uneven heating and excessive joint clearance.

With the above objects in view, it has been found that a satisfactorily soft-soldered stainless steel pipe joint is provided by a method for joining stainless steel pipes by using soft solders comprising the steps of:

preparing a pipe joint having a diametral clearance of from 0.05 to 1.00 mm;

filling said clearance with paste solder, heating said pipe joint to melt said paste solder, and feeding additional soft solder into said clearance immediately after said paste solder is molten by said heating.

A more satisfactory soft-soldered stainless steel pipe joint is provided by a method for joining stainless steel pipes by using soft solders comprising the steps of:

preparing a pipe joint having a diametral clearance of from 0.05 to 1.00 mm;

filling said joint clearance with paste solder, said paste solder comprises from 20 to 80% by weight of a flux composition and from 80 to 20% by weight of powdered solder, and said flux composition comprising a flux component of a mixture comprising from 5 to 50% by weight of phosphoric acid ($H_3PO_4$) and from 95 to 50% by weight of ammonium dihydrogenphosphate ($NH_4H_2PO_4$) in a vehicle;

heating said pipe joint to melt said paste solder; and feeding additional solder into said joint clearance immediately after said paste solder is molten by said heating.

BRIEF DESCRIPTION OF THE DRAWING

The invention will become more readily apparent from the following exemplary description in conjunction with the accompanying drawings, in which:

FIGS. 1(a), 1(b), 1(c), and 1(d) illustrate, in section of the stainless steel pipe joint, the various steps of the method for joining stainless steel pipes according to the invention;

FIG. 2 is a graph comparing the void area in the joint against various joint clearances by the conventional method and the method of the invention;

FIG. 5 is a graph showing the variation of corrosion current to time observed between an AISI 304 series stainless steel and 60%Sn – 40%Pb solder alloy in a chlorine ion-containing aquatic solution.

DETAILED DESCRIPTION OF THE INVENTION

Figure 3:
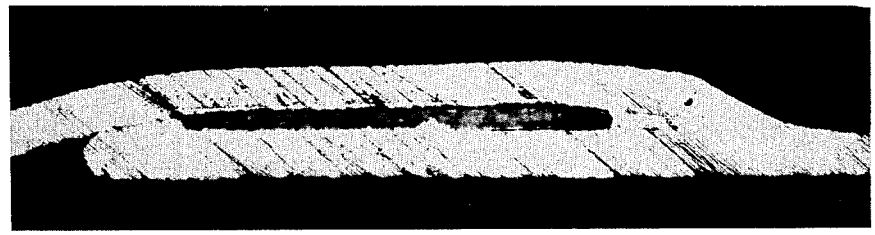
FIG. 3 is a microphotograph of a section of the soft-soldered stainless steel pipe joint soldered by the conventional method.

According to the present invention, paste solder is smeared onto the surfaces of the pipe joint to be joined by soft-soldering. The paste solder contains solder powder in a flux composition. By heating the joint to melt the paste solder, the surfaces defining the joint clearance which should finally be filled with additional soft solder are first plated with the solder of the paste solder. The time when the additional soft solder can successfully be applied can easily be determined, because the molten powder solder exhibits a silvery appearance, clearly indicating that an adequate soldering temperature has been obtained. Then, another solder such as wire solder can be fed into the joint clearance to fill up the same.

According to the method of the invention, therefore, the surfaces defining the joint clearance are completely plated with the solder, and the joint clearance can be almost instantaneously filled with the fed solder without forming any big voids therein even when the joint clearance is such as can not be satisfactorily soldered by the conventional soldering method. It is to be noted that, since the joint clearance cannot be completely filled with the paste solder alone, another additional solder of the soft solder type should preferably be supplied to the joint clearance immediately after observing that the powdered solder within the paste solder has become molten. Although any suitable Sn-Pb base solder may be used as the powdered solder to be contained in the paste solder, a powdered solder comprising 40–80 wt.% tin and 60–20 wt.% lead and finer than 100 mesh is preferable.

The additional solder may have the same composition as the powdered solder. Preferably, the solder of the paste solder may comprise 50% by weight of tin and 50% by weight of lead, and the additional soft solder comprises 50% by weight of tin and 50% by weight of lead. The composition of the additional solder, in same cases, may differ from that of the powdered solder.

In one embodiment of the present invention the pipe joint is prepared by expanding an end portion of a first stainless steel pipe to accommodate an end portion of a second stainless steel pipe. The pipe joint may be prepared by other suitable working such as machining etc. Alternatively, a fitting may be employed for such purpose.

The method of the present invention is suitable for soldering stainless steel pipes by using the phosphoric acid base flux the thermal durability of which is unsatisfactory for use in the conventional soldering method, though phosphoric acid is noncorrosive against stainless steels.

The paste solder for use in the present invention preferably comprises 20–80% by weight of a flux composition and 80–20% by weight of Sn-Pb powder solder, said flux composition comprising a flux component containing a mixture of 5–50% by weight of phosphoric acid ($H_3PO_4$) and 95–50% by weight of ammonium dihydrogenphosphate ($NH_4H_2PO_4$) dissolved or suspended in a vehicle.

The flux composition preferably comprises a flux component containing a mixture of from 10 to 30% by weight of phosphoric acid ($H_3PO_4$) and from 70 to 90% by weight of ammonium dihydrogenphosphate ($NH_4H_2PO_4$) in a vehicle.

Though the vehicle is not limited as long as it does not have any adverse effect on fluxing action of said composition, the vehicle may comprise at least one selected from the group consisting of water, alcohols, glycols and glycol ethers.

The wetting action of the solder against stainless steel is adequate only when sufficient reaction, which is dependent on the temperature, is achieved between the flux and the stainless steel surface. This is particularly conspicuous with the phosphoric acid base fluxes and, therefore, if the heating is not evenly applied over the entire soldering area, the solder will spread unevenly, causing the formation of big voids. Further, the heat resistance of the phosphoric acid base flux, even ammonium dihydrogenphosphate flux, is lower than that of chloride flux, requiring considerable skill to provide a satisfactorily soldered joint.

According to the conventional method for soldering the stainless steels, therefore, the stainless steel surface activated by the noncorrosive phosphoric acid-containing flux has to be kept activated by adding a copper salt or a tin salt to the flux to improve the narrow activation temperature range of the flux. With the paste solder for stainless steel pipes used in the present invention, however, the activated surface is protected by the immediately molten powdered solder contained in the paste solder. Therefore, satisfactory results can be achieved by the flux composition of phosphoric acid and ammonium dihydrogenphosphate alone, copper salt or tin salt being not necessarily required. As long as phosphoric acid and ammonium dihydrogenphosphate are used as the main components of the flux composition, other components may be permitted to be included except for chlorides, sulfide and nitrates. As has previously been mentioned, chlorides may pit the stainless steel surface, and sulfides and nitrates may adversely affect the solderability, so they should strictly be excluded.

Thus, the flux composition of the present invention may comprise up to 20% by weight of an additional ingredient excluding chlorides, sulfides and nitrates. In one embodiment of the present invention, the additional ingredient may be selected from the group consisting of copper salts and tin salts. For example, it includes copper salts, such as copper phosphate, copper carbonate etc., and tin salts, such as tin phosphate.

PREFERRED EMBODIMENT OF THE INVENTION

Referring now to FIG. 1 of the drawings, there is illustrated a series of steps (a – e) in which a pair of end portions of first and second stainless steel pipes 1 and 2 for use in water or hot water supply piping is soft-soldered in accordance with the method of the present invention. The second stainless steel pipe 2 is expanded as shown in Step (a) at 3 at its joining end to have a joint clearance of from 0.05 to 1.00 mm when the first pipe 1 is inserted into the expanded end portion 3 of the second pipe 2. The surface of the end portions of the first and second pipes 1 and 2 to which the solder is to be applied are degreased prior to the application of the invention.

The outer surface of the end portion of the first pipe 1 is then smeared with a paste solder 4 comprising Sn-Pb powdered solder and the previously mentioned flux composition containing as its main components phosphoric acid and ammonium dihydrogenphosphate as shown in Step (b). The first stainless steel pipe 1 is then inserted into the expanded end portion 3 of the second stainless steel pipe 2 until the peripheral edge of the first stainless steel pipe 1 abuts against the reduced inner wall of the expanded end portion 4 of the second pipe 2. It is to be noted that, as seen in Step (c), the paste solder 4 fills the annular spacing or diametral clearance formed between the end portions of the first and second pipes 1 and 2, and that the first and second pipes 1 and 2 should preferably held by any suitable supporting means in order to ensure that the radial dimension of the joint clearance is substantially equal over its entire periphery during the soldering operation.

In Step (d) is illustrated the stainless steel pipe joint under the heating operation which is carried out evenly (evenness of heating is not strictly required as in the conventional method) around the pipe joint by any suitable heating apparatus such as a propane gas burner 5. When heated, the powdered solder contained in the paste solder 4 in the joint clearance is molten to exhibit a silvery appearance and to be plated as shown at 6 on the pipe surfaces defining the joint clearance as seen in Step (d). This means that the optimum soldering temperature is reached. Immediately after observing that the powdered solder is completely molten and knowing that the proper soldering temperature is obtained in the joint clearance, any other suitable additional solder such as wire solder 7 is fed into the joint clearance, while continuing the heating operation to completely fill up the joint clearance with molten solder 8 as shown in Step (e). It is to be noted that the molten powdered solder 6 is mixed with the molten additional solder 7 to form a single solder alloy 8 while the solder 7 is being added.

The following examples are illustrative of the method for joining stainless steel pipes in accordance with the present invention.

EXAMPLE 1

1. Preparation of Paste Solder 50 wt% of a flux composition comprising the components given below and 50 wt% of powdered solder comprising 60 wt% of tin and 40 wt% of lead (150 mesh) were perfectly mixed to prepare the paste solder:

| | | |
|---|---|---|
| Ammonium dihydrogenphosphate | 75 wt% | |
| | | 68 wt% |
| Phosphoric acid | 25 wt% | |
| Diethylene glycol monoethyl ether | | 29 wt% |
| Water | | 3 wt% |

2. Soldering Operation

Two stainless steel pipes of AISI 304 stainless steel having an outer diameter of 22.2 mm and wall thickness of 0.8 mm were used to form a pipe joint having a joint clearance of from 0.2 to 0.3 mm and an overlapping dimension of 20 mm. After degreasing the surfaces to be soldered with trichloroethylene available under the trade name TRICLENE, the aforementioned paste solder was smeared onto the outer surface of the first pipe to be inserted into the expanded end portion of the second pipe. After assembling the stainless steel pipe joint, the pipe joint was heated by a propane gas burner. Upon observing that the flux was boiling and the powdered solder in the flux was molten, wire-shaped soft solder comprising 3.5 wt% of silver and 96.5 wt% of tin and having a diameter of 1.6 mm was fed into the clearance while it was being heated.

3. Test Results

The resulting soldered pipe joint was subjected to a water pressure of 60 kg/cm$^2$ for three minutes and no water leakage, etc. was found. The tested pipe joint exhibited a tensile strength of 3,100 kg, which is also strong enough for the purpose.

FIG. 2 is a graphical representation of the void area in percentage of soldered AISI 304 stainless steel pipe joint plotted against various joints clearances in millimeters. Curve A represents the void area in pipe joints soft-soldered in accordance with the method of the present invention, and Curve B represents the void area in joints as soldered by the conventional end-feed soldering method using a flux of chloride base.

From the graph it is clearly seen that the method of the present invention remarkably decreases the void area in pipe joints over the entire tested range of various joints clearances as compared with that provided by the conventional soldering method.

Figure 4:
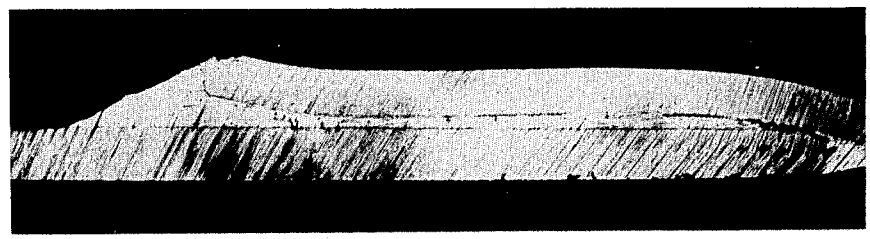
FIG. 4 is a microphotograph of a section of the stainless steel pipe joint soldered in accordance with the invention.

FIGS. 3 and 4 are photomicrographs (magnification 10X) of the sections of the soldered stainless steel pipe joints obtained by a conventional soldering method using a chloride base flux and by the method in accordance with the present invention, respectively. These photomicrographs clearly show that the joint of stainless steel pipes soft-soldered by the method of the invention (FIG. 4) has no big void which is fatal to the pipes for use in water or hot water supply piping and is substantially perfect, while the stainless steel pipe joint soldered by the conventional method (FIG. 3) has many big voids.

EXAMPLE 2

1. Preparation of Paste Solder 50 wt% of a flux composition comprising the components given below and 50 wt% of powdered Sn-Pb solder comprising 50 wt% of tin and 50 wt% of lead (250 mesh) were mixed within an agitator to prepare paste solder:

| | | |
|---|---|---|
| Ammonium dihydrogenphosphate | 80 wt% | |
| Phosphoric acid | 19 wt% | 35 wt% |
| Copper phosphate | 1 wt% | |
| Diethylene glycol | | 65 wt% |

2. Soldering Operation

Two stainless steel pipes of AISI 304 stainless steel having an outer diameter of 22 mm and wall thickness of 1 mm were used to form a pipe joint having a diametral clearance of from 0.1 to 0.2 mm and an overlapping dimension of from 16 to 17 mm. After degreasing the surfaces to be soldered with trichloroethylene (TRICLENE) the aforementioned paste solder was smeared onto the outer surface of the first pipe to be inserted into the expanded end portion of the second pipe. After assembling the stainless steel pipe joint, the pipe joint was heated by a propane gas burner. Upon observing that the flux was boiling and the powdered solder in the flux was molten, wireshaped soft solder comprising 50 wt% tin and 50 wt% lead and having a diameter of 1.6 mm was immediately fed into the joint while it was being heated.

3. Test Results

The resulting soft-soldered stainless steel pipe joint was subjected to a water pressure of 35 kg/cm$^2$ at its inner surface for three minutes, and no water leakage or the like was found. The tested pipe joint exhibited a tensile strength of 2,750 kg, which is strong enough for use in water supply piping.

It has heretofore been believed that a soft solder alloy cannot be satisfactorily used in soldering stainless steels because of an electrical potential difference established between the solder alloy and the stainless steel, which causes the corrosion of the solder alloy, thereby to degrade the corrosion resistance of the soft-soldered pipe joint. Therefore, silver-brazing alloy which has been believed to cause a potential difference smaller than the soft-solder alloy (e.g. an Sn-Pb base alloy) has been used for soldering stainless steels.

However, in accordance with the method of the present invention, it has now been found that the soft solder alloy can be more satisfactorily used in soldering stainless steels from the viewpoint of the potential difference. This is clearly seen in FIGS. 5 and 6.

FIG. 5 shows the magnitude of the galvanic corrosion electrical current in $\mu$A that flows between the soft solder alloy and the AISI 304 stainless steel in water containing 200 ppm Cl$^-$ at room temperature. The corrosion current is plotted against time in days. From the Figure it is seen that the electrical current was high for several days, but rapidly decreased after one month after which no appreciable current was detected and the soft-soldered joint was kept in the stable state.

Figure 6:
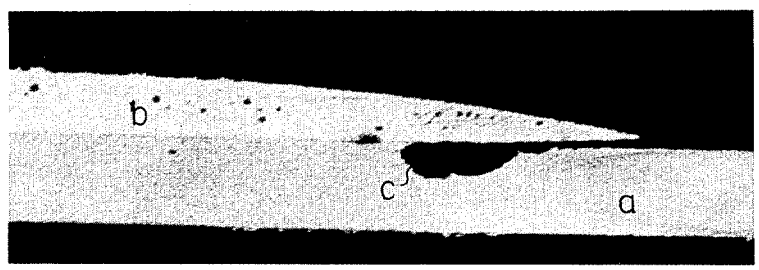
FIG. 6 is a microphotograph of a section of stainless steel which was brazed with a silver brazing alloy, showing the corrosion that appeared in the stainless steel base.

FIG. 6 is a microphotograph (magnification of the section 10X) of a joint formed by silver brazing alloy (Ag-Cu-In-Ni) and AISI 304 stainless steel after immersed in water containing 200 ppm Cl$^-$ at 80°C for one month. The microphotograph clearly shows that the joint formed by the silver brazing alloy $b$ and stainless steel $a$ has a corrosion $c$ in the stainless steel $a$. Thus, the silver brazing alloy is not satisfactory for use in soldering stainless steel pipes.

From the foregoing, it is clear that the present invention provides a method for joining stainless steel pipes for use in water or hot water supply piping by using soft solders, which can provide a satisfactory stainless steel pipe joint and which has many advantages over the conventional methods for joining stainless steel pipes.

We claim:

1. A method for joining stainless steel pipes by using soft solder the ythe steps of:
   preparing a pipe joint having a diametral clearance of from 0.05 to 1.00 mm,
   filling said clearance with paste solder, said paste solder comprising from 20 to 80% by weight of a flux composition and from 80 to 20% by weight of powder solder, and said flux composition comprising a flux component of a mixture comprising from 5 to 50% by weight of phosphoric acid (H$_3$PO$_4$) and from 95 to 50% by weight of ammonium dihydrogenphosphate (NH$_4$H$_2$PO$_4$) in a vehicle;
   heating said pipe joint to melt said paste solder; and
   feeding additional soft solder into said clearance immediately after said paste solder is molten by said heating.

2. A method for joining stainless steel pipes as claimed in claim 1, wherein said flux composition comprises a flux component containing a mixture comprising from 10 to 30% by weight of phosphoric acid (H$_3$PO$_4$) and from 70 to 90% by weight of ammonium dihydrogenphosphate (NH$_4$H$_2$PO$_4$) in a vehicle.

3. A method of joining stainless steel pipes as claimed in claim 1, wherein said powder solder is an Sn-Pb powder solder and said vehicle is at least one selected from the group consisting of water, alcohols, glycols, and glycol-ethers.

4. A method of joining stainless steel pipes as claimed in claim 1, wherein said flux composition comprises up to 20% by weight of an additional ingredient excluding chlorides, sulfides and nitrates and the rest being said mixture.

5. A method of joining stainless steel pipes as claimed in claim 4, wherein said additional ingredient is selected from the group consisting of copper salts and tin salts.

6. A method for joining stainless steel pipes as claimed in claim 1, wherein said paste solder comprises 50% by weight of a flux composition and 50% by weight of an Sn-Pb powder solder, said flux composition comprising 29% by weight of diethylene glycol monoethyl ether, 3% by weight of water and 68% by weight of a flux component containing 75% by weight of ammonium dihydrogenphosphate and 25% by weight of phosphoric acid.

7. A method for joining stainless steel pipes as claimed in claim 1, wherein said paste solder comprises 50% by weight of a flux composition and 50% by weight of an Sn-Pb powder solder, said flux composition comprising 65% by weight of diethylene glycol and 35% by weight of a flux component containing 80% by weight of ammonium dihydrogenphosphate, 19% by weight of phosphoric acid and 1% by weight of copper phosphate.

* * * * *